United States Patent
Peden et al.

(10) Patent No.: US 8,428,551 B1
(45) Date of Patent: Apr. 23, 2013

(54) CONTEXTUAL VIDEO VOICE MESSAGE ENHANCEMENT

(75) Inventors: Mark D. Peden, Olathe, KS (US); Raymond Reeves, Olathe, KS (US); Simon Youngs, Overland Park, KS (US); Piyush Jethwa, Overland Park, KS (US); Gary D. Koller, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 182 days.

(21) Appl. No.: 13/023,286

(22) Filed: Feb. 8, 2011

(51) Int. Cl.
*H04Q 7/20* (2006.01)

(52) U.S. Cl.
USPC .......................... 455/405; 709/206; 455/413

(58) Field of Classification Search .................. 455/405, 455/413, 406, 414.1; 709/206, 204, 205; 705/30; 379/114.12; 370/352
See application file for complete search history.

(56) References Cited

U.S. PATENT DOCUMENTS

2008/0311885 A1* 12/2008 Dawson et al. ............... 455/406
2009/0150400 A1*  6/2009 Abu-Hakima et al. ......... 707/10

* cited by examiner

*Primary Examiner* — Phuoc Doan

(57) ABSTRACT

Methods, systems, and computer-readable media are provided for providing enhanced video voice messages from a first mobile device to a second mobile device. The method comprises providing user preferences from a first mobile device to a video enhancement component. A video voice message is generated at the first mobile device. Additionally, the video voice message is communicated to the video enhancement component. Further, the video voice message is enhanced based on the user preferences from the first mobile device. The enhanced video voice message is then provided to the second mobile device.

20 Claims, 8 Drawing Sheets

CONTEXTUAL VIDEO VOICE MESSAGE ENHANCEMENT

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify essential features of the claimed subject matter, nor is it intended to be used as an aid in isolation to determine the scope of the claimed subject matter.

The use of mobile devices to keep in touch has increasingly allowed users to contact friends and family from almost any location. Further, users are increasingly communicating via video, not just auditory, calls. Business calls that users may have previously conducted in casual attire are now expected to include video of the communicating parties. While this does allow for additional facets of communication to be perceived, such as body language, it is also an extra burden for a call participant to always look professional, especially on short-notice calls. As such, it would be beneficial to allow call participants to dress as they like while being perceived in a professional manner that is appropriate to the nature of the call.

In a first aspect, a set of computer-useable instructions facilitate a method of providing enhanced video voice messages from a first mobile device to a second mobile device. The method comprises providing user preferences from a first mobile device to a video enhancement component. The method also comprises generating a video voice message at the first mobile device. Additionally, the method comprises communicating the video voice message to the video enhancement component. The method also comprises enhancing, at the video enhancement component, the video voice message based on the user preferences from the first mobile device. Further, the method comprises providing the enhanced video voice message to the second mobile device.

In a second aspect, a set of computer-useable instructions facilitate a method of providing enhanced video voice messages from a first mobile device to a second mobile device. The method comprises receiving, from a first mobile device, user preferences associated with enhancing a video voice message. The method also comprises receiving a video voice message from the first mobile device. The video voice message is directed to a second mobile device having identification information. Additionally, the method comprises determining user preferences associated with the identification information of the second mobile device based on the identification information of the second mobile device. Further, the method comprises enhancing the video voice message based on the determined user preferences. The method also comprises providing the enhanced video voice message to the second mobile device.

In a third aspect a set of computer-useable instructions facilitate a method of providing enhanced video voice messages from a first mobile device to a second mobile device. The method comprises providing user preferences from a first mobile device to a video enhancement component. The user preferences are based on contextual information of the first mobile device. The method also comprises generating a video voice message at the first mobile device. The video voice message comprises contextual information of the first mobile device. Additionally, the method comprises communicating the video voice message to the video enhancement component. The method also comprises enhancing, at the video enhancement component, the video voice message based on the contextual information of the first mobile device. Further, the method comprises providing the enhanced video voice message to the second mobile device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
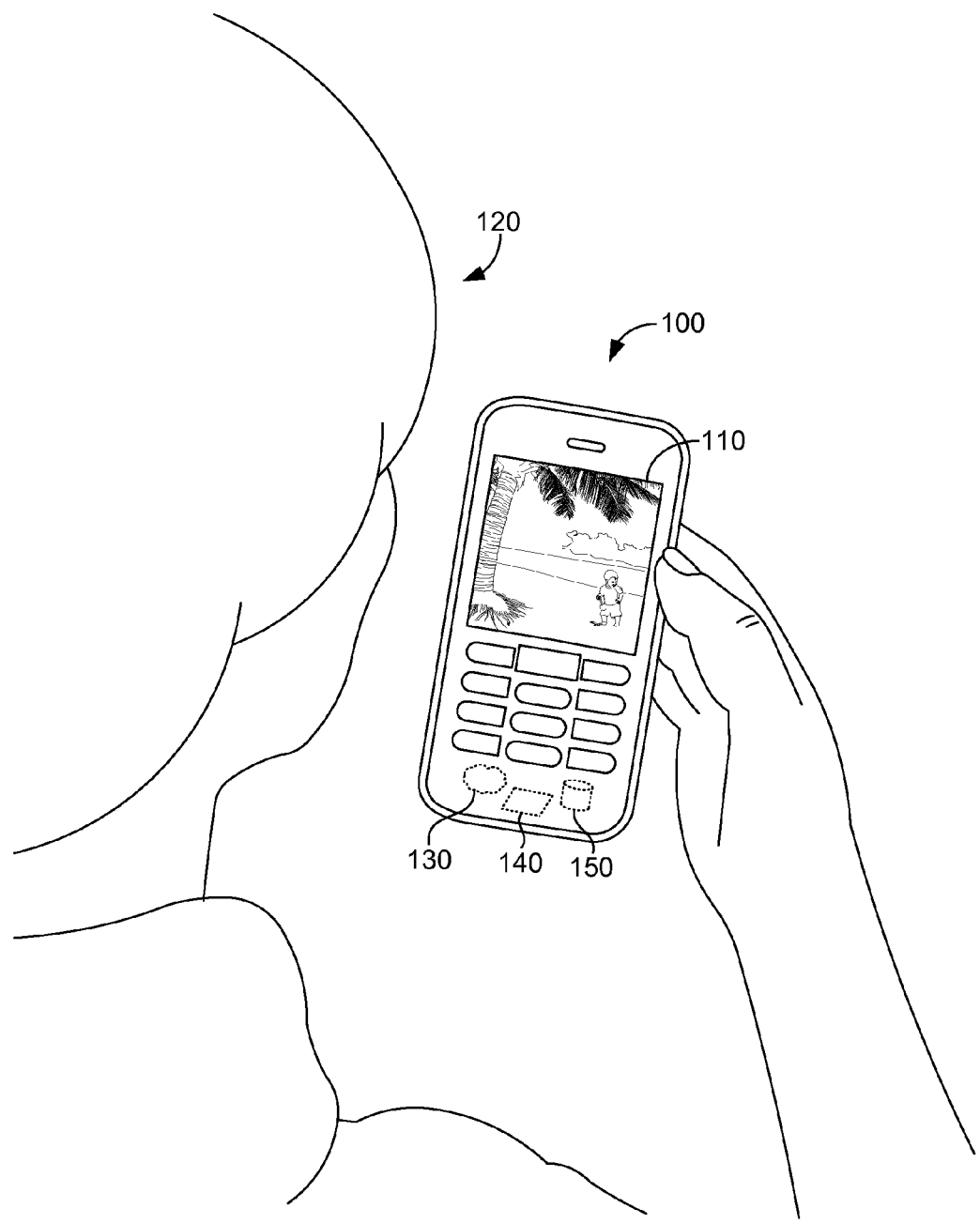
FIG. 1 is an illustrative mobile device, in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD | Compact Disc |
| CD-ROM | Compact Disk Read Only Memory |
| DVD | Digital Versatile Discs |
| DyVINe | Dynamic VVM Irreality Nexus |

-continued

| | |
|---|---|
| EEPROM | Electrically Erasable Programmable Read Only Memory |
| ESN | Electronic Serial Number |
| IP | Internet Protocol |
| MP3 | MPEG-1 Audio Layer 3 |
| NAI | Network Address Identifier |
| PC | Personal Computer |
| PDA | Personal Digital Assistant |
| RAM | Random Access Memory |
| ROM | Read Only Memory |
| SPS | Subscription Profile Server |
| VCS | Video Communication Server |
| VVM | Video Voicemail |

Further, various technical terms are used throughout this description. An illustrative resource that fleshes out various aspects of these terms can be found in Newton's Telecom Dictionary by H. Newton, 25th Edition (2009).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, Random Access Memory (RAM), Read Only Memory (ROM), Electrically Erasable Programmable Read Only Memory (EEPROM), flash memory or other memory technology, Compact Disk Read Only Memory (CD-ROM), digital versatile discs (DVD), holographic media or other optical disc storage, magnetic cassettes, magnetic tape, magnetic disk storage, and other magnetic storage devices. The data on the media can be stored momentarily, temporarily, or permanently.

In some embodiments, systems, methods, and computer-readable media for enhancing video voice messages based on context are provided. In particular, claimed embodiments of the present invention enhance a video voice message sent from a first mobile device to a second mobile device based on contextual information of the first mobile device, second mobile device, video voice message, or combination thereof. Contextual information may include the location of the first mobile device initiating the video voice message; the location of the second mobile device receiving the video voice message; the nature of the video voice message; the time of day the video voice message is sent, etc.

As such, methods described herein can be used to adjust the presentation of a video voice message that is sent from a first mobile device to a second mobile device. In particular, user preferences of a user of the first mobile device are stored at a system used to manage alteration of the video voice message. In embodiments, the system used to manage alteration of the video voice message may be a Dynamic Video Voicemail Irreality Nexus (DyVINe) server. As such, user preferences may be stored at a DyVINe server in association with the first mobile device. User preferences may include alterations to a video voice message based on context of the video voice message being sent. For example, a user may store preference related to backgrounds to be presented when a video voice message is destined for a certain location. Alternatively, a user may store preferences related to backgrounds to be presented when a video voice message is originating from a certain location. Accordingly, when a user of the first mobile device initiates a video voice message from his beach home, he may have a preference stored at the DyVINe server to adjust the background of any video voice message from that location to have an office-like background.

Turning now to FIG. 1, an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a personal digital assistant (PDA). This description does not intend to convey bright-line distinctions between the different types of mobile devices. Indeed, what one might refer to as a PDA, another might refer to as a mobile device or cell phone or even a personal computer (PC).

Mobile device 100 may include a user interface 110, a user 120, application 130, memory 140, and data structure 150. Generally, user interface 110 provides an input/output (I/O) interface that user 120 may engage to interact with device 100. For example, user interface 110 may include a touch screen that a user may scratch or touch to interact with device 100. This interaction may include generating a video voice message or displaying a video voice message as see in FIG. 1.

The mobile device 100 can be any computing device. In embodiments, mobile device 100 may be capable of web accessibility. Device 100 might take on a variety of forms, such as a PC, a laptop computer, a mobile phone, a PDA, a compact disc (CD) player, a MPEG-1 Audio Layer 3 (MP3) player, a video player, a handheld communications device, a workstation, any combination of these devices, or any other mobile device, including a device that is capable of web accessibility. In one embodiment, device 100 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

Device 100 may also include application 130, memory 140, and data structure 150. Application 130 may carry out various functional aspects and might take on a variety of forms. For example, application 130 might include configuration settings, might facilitate communicating data between multiple devices, might handle updates, include user settings, etc. Specifically, application 130 may be used to provide premium services, such as pay-per-view movies, to user 120 of mobile device 100 once user 120 has been authenticated using methods disclosed herein. Alternatively, application 130 may be used by a user to manage an account associated with the mobile device.

Memory 140 may include a data structure 150 that stores and facilitates the operation of application 130. For example, memory 140 may store data relating to an image and/or information displayed on user interface 110, as well as information related to backgrounds for video voice messages. In addition, memory 140 may store firmware and other various software modules and components that might be present in mobile device 100. These modules and components may be used in embodiments of the present invention to present premium services on mobile device 100. Other examples of illustrative software include things such as the operating system of a phone, third-party applications such as games, programs to watch television on the device, ring tones, location-based services, contact information, and the like. In sum, FIG. 1 is not meant to indicate all, or even major, systems or components of mobile device 100. An overview of mobile device 100 is presented and certain components are listed so as to be able to refer to them throughout this disclosure.

Figure 2:
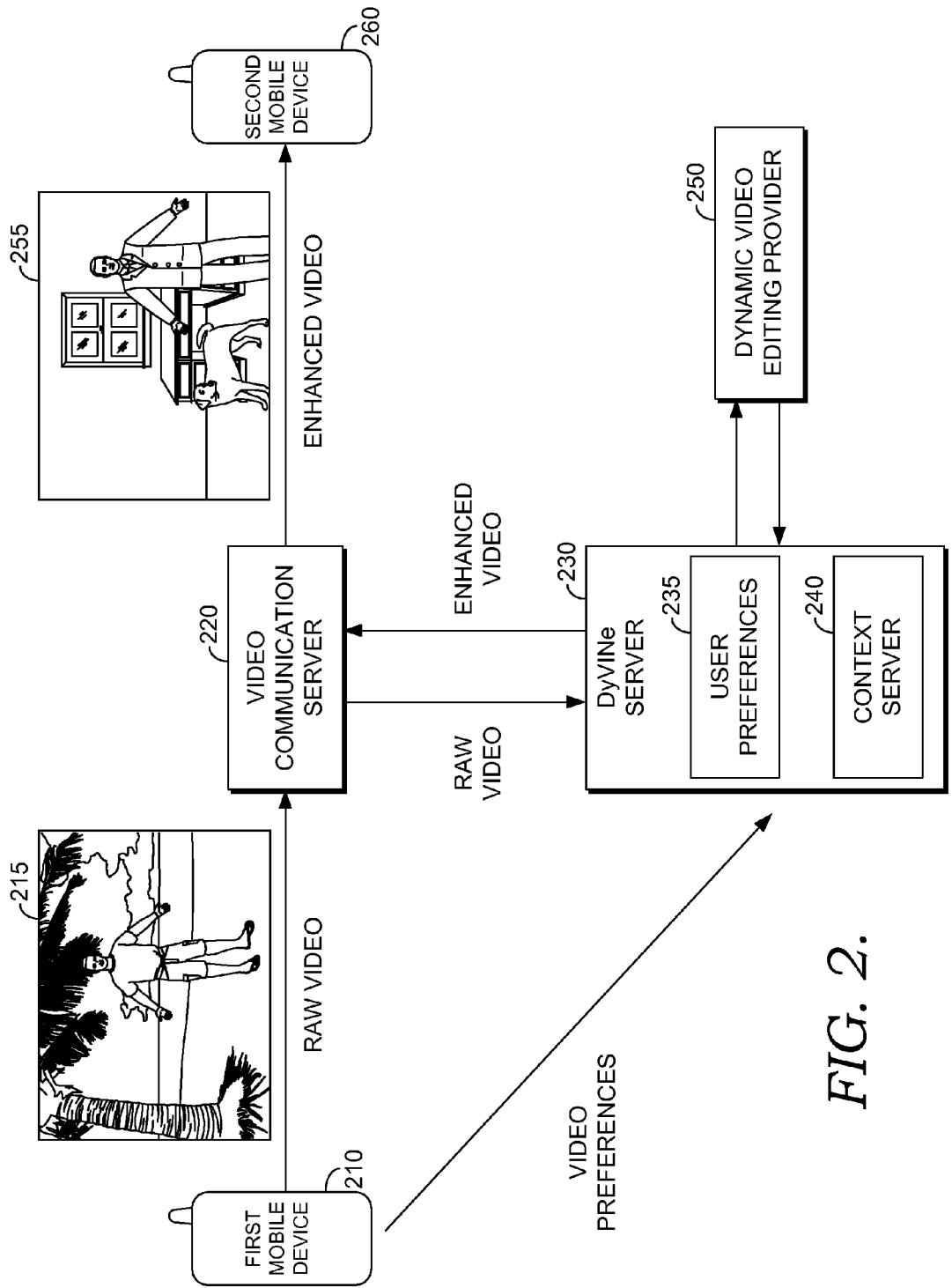
FIG. 2 is a schematic diagram of an illustrative system used to provide enhanced video voice messages from a first mobile device to a second mobile device, in accordance with an embodiment of the present invention.

FIG. 2 is a schematic diagram of an illustrative system 200 used to provide enhanced video voice messages from a first mobile device to a second mobile device, in accordance with an embodiment of the present invention. System 200 comprises first mobile device 210, raw video 215, video communication server (VCS) 220, DyVINe server 230, user preferences 235, context server 240, dynamic video editing provider 250, enhanced video 255, and second mobile device 260. First mobile device 210 and second mobile device 260 may be mobile device 100 as described above. Further, first mobile device 210 may be used by a user to generate video voice messages to send to second mobile device 260.

VCS 220 may direct video voice messages from first mobile device 210 to second mobile device 260. In particular, VCS 220 may receive raw video 215, send raw video 215 to DyVINe server 230, receive enhanced video 255 from DyVINe server 230, and provide enhanced video 255 to second mobile device 260. Further, DyVINe server 230 may support traditional video communication servers. Mobile devices that generate video voice messages may be unaware of DyVINe server 230 or, alternatively, may be modified to include a DyVINe client for direct interaction with DyVINe server 230.

DyVINe server 230 may store alternative images, such as backgrounds, to enhance video voice messages. The alternative images may include videos. Further, DyVINe server 230 may store user preferences 235 of mobile device users. In particular, user preferences may indicate the amount of enhancement that may be allowed; the types of enhancements that may be allowed; and a category of enhancements that may be allowed based on permissions given to a user. For example, when multiple users are on a single account, one or more of the multiple users may be administrators and may restrict the enhancements allowable for the other users. This may be the case where children are on their parents' account. Additionally, DyVINe server 230 may enhance video voice messages with auxiliary information related to the mood of a user, an intention related to the communication, etc.

User preferences of a user may be assessed against context server 240 to determine enhancements to make to video voice messages. In particular, context server 240 may include enhancements that are available to adjust video voice messages. For example, a user preference may be that a user in a video voice message be dressed professionally. Context server 240 may assess the video voice message to determine whether the raw video meets the user preference. Additionally, context server 240 may provide a business suit enhancement to enhance the video voice message to meet the user preference. In embodiments, an image of a business suit used to enhance a video voice message may be stored at context server 240, DyVINe server 230, or first mobile device 210.

Additionally, DyVINe server 230 may enhance raw video 215 using a dynamic video editing provider 250. The dynamic video editing provider 250 may take the enhancements determined based on user preferences 235 and context server 240 and may edit the raw video 215 to become enhanced video 255. The enhanced video 255 may then be sent from DyVINe server 230 to VCS 220 and provided to second mobile device 260.

Figure 3:
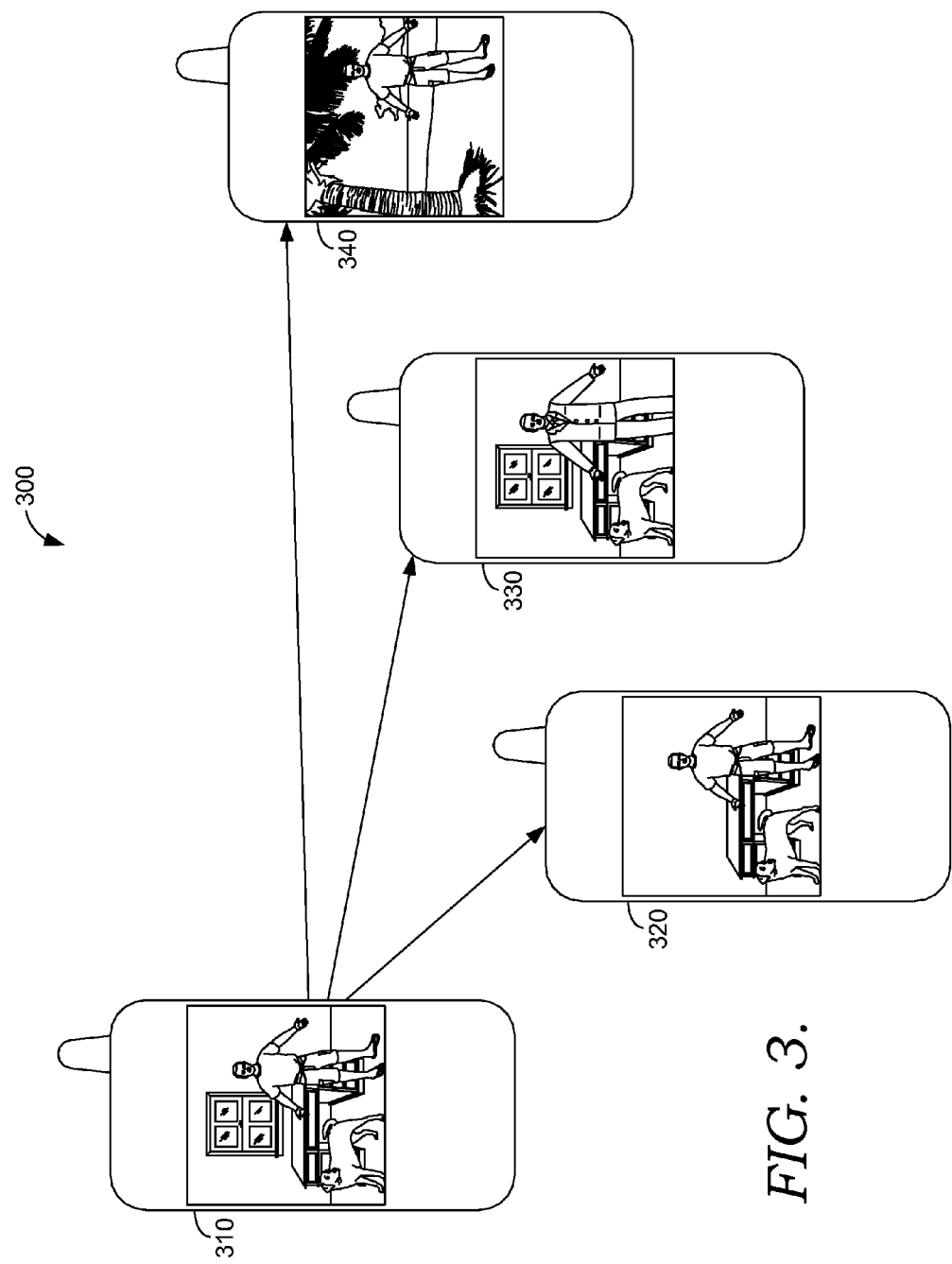
FIG. 3 is a schematic diagram that illustrates providing enhanced video voice messages from a first mobile device to a plurality of mobile devices, in accordance with an embodiment of the present invention.

FIG. 3 is a schematic diagram 300 that illustrates providing enhanced video voice message content from a first mobile device to a plurality of mobile devices, in accordance with an embodiment of the present invention. In particular, diagram 300 illustrates a first mobile device 310 sending enhanced video voice messages to a plurality of mobile devices 320, 330, and 340. As seen in diagram 300, first mobile device 310 displays raw video. Further, each of the plurality of mobile device 320, 330, and 340 display uniquely enhanced video.

For example, raw video from first mobile device 310 comprises an image of a user at his home. Given that the image in 310 has a window, the video voice message has an inherent indication of time based on the light outside the window. As such, a user may adjust the video voice message to be time-independent by removing the window. Accordingly, the enhanced video sent to mobile device 320 has the window removed. Alternatively, a user may want to look professional in his video voice message, and as such may enhance the raw video from first mobile device 310 to include a business suit as shown on mobile device 330.

A user may also want to change the location of his background, so as to appear that he is calling from another location. As such, mobile device 340 presents an enhanced video voice message that has a beach background. In accordance with embodiments of the present invention, these user preferences may be stored in accordance with identification information of each mobile device 320, 330, and 340. As such, a user may simultaneously send a video voice message to these mobile devices and have each enhanced video voice message comprise an unique presentation.

Figure 4:
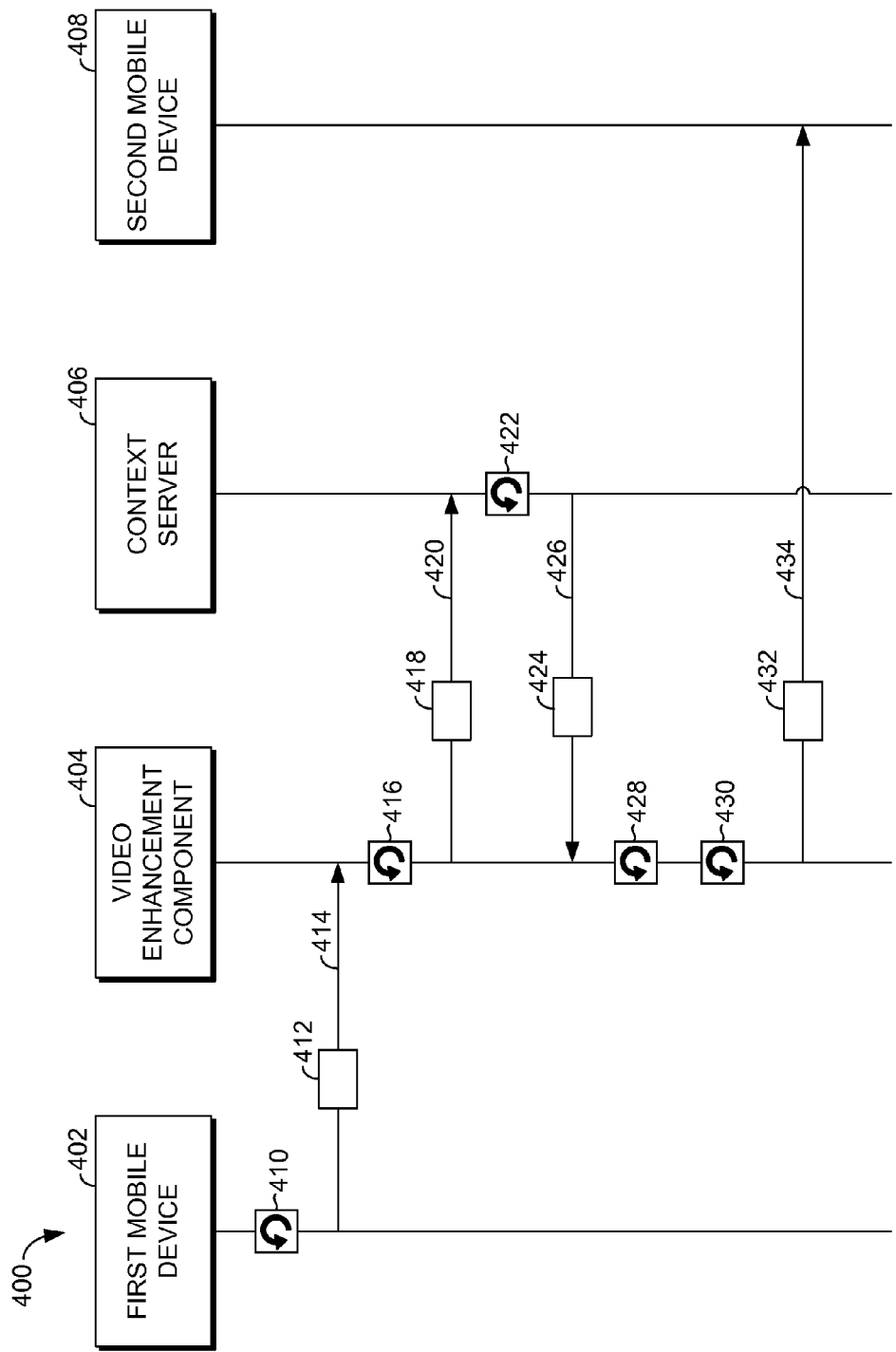
FIG. 4 is a process flow diagram showing an embodiment of a method of providing enhanced video voice messages from a first mobile device to a second mobile device, in accordance with an embodiment of the present invention.

FIG. 4 is a process flow diagram 400 showing an embodiment of a method of providing enhanced video voice message from a first mobile device to a second mobile device, in accordance with an embodiment of the present invention. In particular, FIG. 4 provides flow diagram 400 for enhancing a video voice message generated at a first mobile device, such as first mobile device 402. Initially, a video voice message 412 is generated 410 at first mobile device 402. Video voice message 412 is sent 414 to video enhancement component 404.

Once video voice message 412 is received 416 at video enhancement component 404, a context query 418 is generated 416 at video enhancement component 404. In particular, a context query 418 comprises a context of video voice message 412 and requests video enhancements associated with the context of video voice message 412. Context query 418 is sent 420 to context server 406. At 422, context server 406 generates context response 424 comprising video enhancements based on the context of video voice message 412. In particular, context server 406 may generate context response 424 by assessing the context of video voice message 412 against stored user preferences associated with contexts of video voice message 412.

For instance, if a video voice message 412 originates from first mobile device 402 located in Florida, a user preference may be stored in context server that indicates an office background be placed in the background of a video voice message. Accordingly, under the example above, context response 424 may comprise instructions that video voice message 412 be adjusted to include an office background. Context response 424 is sent 426 to video enhancement component 404.

Once context response 424 is received at video enhancement components 404, video voice message 412 is enhanced 428 according to instructions within context response 424. For example, under the example above, a background image would be retrieved and the background of video voice message 412 would be adjusted to match the background. Alternatively, if instructions were to slow down the speed of content of a transmission of any voice message to a certain network access identifier (NAI) associated with a second mobile device, video voice message 412 would be enhanced 428 to slow down the speed of voice the playback of video voice message 412.

Slowing playback of video voice message 412 may be desired when communicating a vide voice message 412 to users who are not as familiar with the language of the original transmission. Alternatively, video voice message 412 may be enhanced 428 by translating video voice message 412 to a language associated with identifying information of a second mobile device, such as an electronic serial number (ESN). Once video voice message 412 is enhanced 428, video enhancement component generates 430 an enhanced video voice message 432. Enhanced video voice message 432 is sent 408 to second mobile device.

Figure 5:
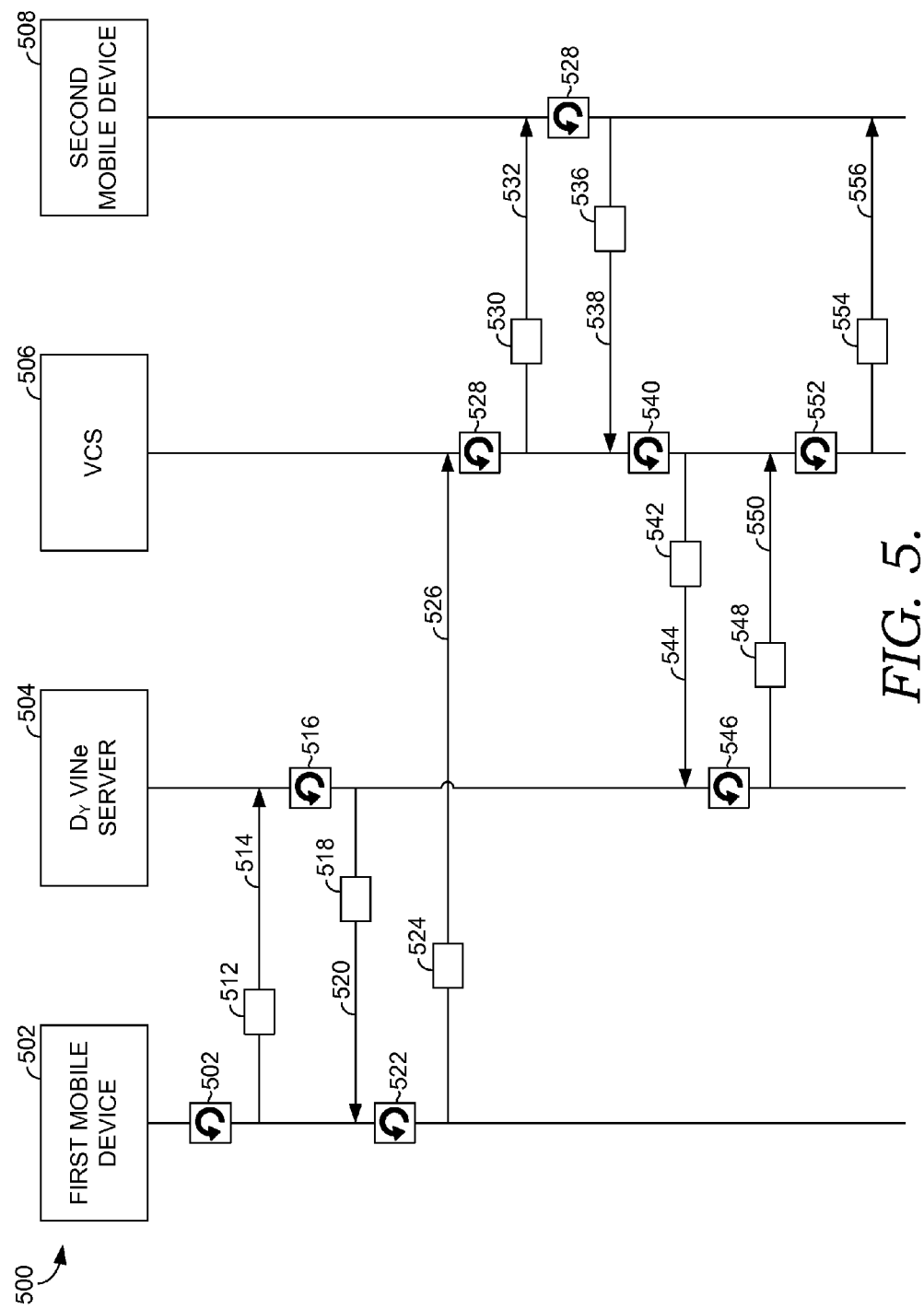
FIG. 5 is a process flow diagram showing an embodiment of a method of providing enhanced video voice messages from a first mobile device to a second mobile device, in accordance with an embodiment of the present invention.

FIG. 5 is a process flow diagram 500 showing an embodiment of a method of providing enhanced video voice message content from a first mobile device to a second mobile device, in accordance with an embodiment of the present invention. Initially, a registration request 512 is generated 510 at first mobile device 502. In particular, registration request 512 is a request to registered at DyVINe server 504. As such, registration request 512 is sent 514 to DyVINe server 504. At DyVINe server 504, first mobile device 502 is registered 516. When first mobile device 502 is registered 516 at DyVINe server 504, user preferences from first mobile device 502 may be stored at DyVINe server 504. The user preferences may be included within registration request 512. For example, user preferences may comprise instructions that a person presented within a video voice message wear business attire when a video voice message relates to corporate affairs. Alternatively, the user preferences may be provided to DyVINe server 504 at a later time. Still at 516, notification 518 is generated at DyVINe server 504. Further, notification 518 is sent 520 to first mobile device 502.

Once first mobile device 502 has registered 516 at DyVINe server 504, a voice video message 524 is generated 522. Video voice message 524 is sent 526 to video communication server (VCS) 506. At 528, a message notification 530 is generated at VCS 506. In particular, message notification 530 is sent 532 to second mobile device 508 to inform second mobile device 508 that video voice message 524 has been received. Further, second mobile device 508 may generate 534 response 536 requesting information associated with video voice message 524. In particular, response 536 may request information associated with a subject of video voice message 524. Response 536 is sent 538 from second mobile device 508 to VCS 506.

Additionally, VCS 506 generates 540 message 542 comprising video voice message 524 and request information from response 536. Message 542 is sent 544 to DyVINe server 504. At DyVINe server 504, video voice message 524 is enhanced 526 based on user preferences stored at DyVINe server 504. Alternatively, user preferences may be accessible by DyVINe server 504 but stored elsewhere. In further embodiments, user preferences may be requested from first mobile device 502 in response to receiving video voice message 524 at DyVINe server 504. In other embodiments, user preferences may be embedded within video voice message 524. At 550, enhanced video voice message 548 is sent to VCS 506. Additionally, VCS 506 determines 552 where to send enhanced video voice message 554 and sends 556 video voice message 554 to second mobile device 508.

Figure 6:
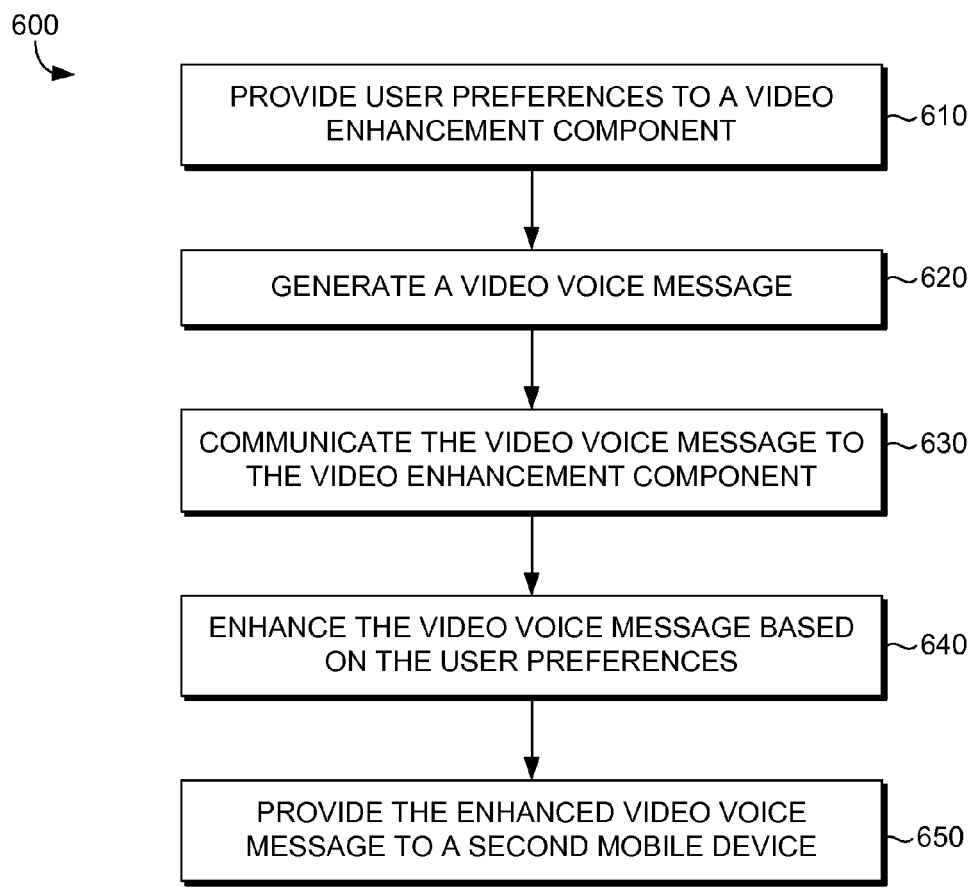
FIG. 6 is a flow diagram showing an embodiment of a method of providing enhanced video voice messages from a first mobile device to a second mobile device, in accordance with an embodiment of the present invention.

FIG. 6 is a flow diagram 600 showing an embodiment of a method of providing enhanced video voice message content from a first mobile device to a second mobile device, in accordance with an embodiment of the present invention. At step 610, user preferences are provided from a first mobile device to a video content enhancement component. At step 620, a video voice message is generated at the first mobile device. At step 630, the video voice message is communicated to the video enhancement component. At step 640, the video voice message is enhanced based on the user preferences from the first mobile device. In particular, the video voice message is enhanced at the video enhancement component.

For example, a background stored in association with the user preferences of the first mobile device is retrieved. A background of the video voice messages is adjusted to match the background stored in association with the user preferences from the first mobile device. The background may be stored at the video enhancement component or at the first mobile device. In another example of enhancing the video voice message, the clothes of a person in the video voice message may be modified.

At step 650, the enhanced video voice message is provided to the second mobile device. In further embodiments, a video voice message addressed to a plurality of mobile devices may be generated. Each of the plurality of mobile devices may have unique identification information. Further, the video voice message may be adjusted based on identification information of the plurality of mobile devices. Additionally, each of the plurality of mobile devices may be presented with an uniquely enhanced video voice message.

Figure 7:
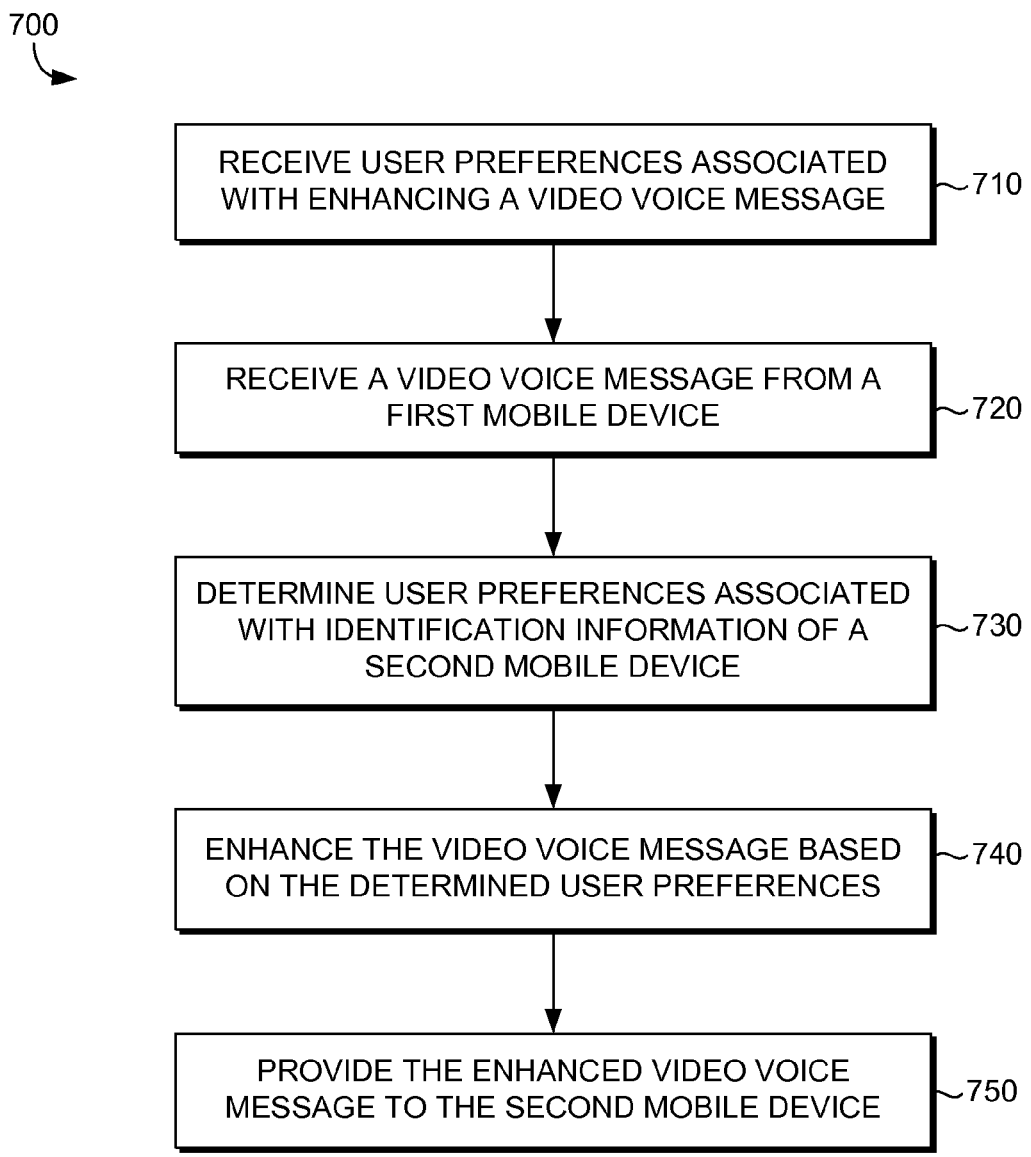
FIG. 7 is another flow diagram showing an embodiment of a method of providing enhanced video voice messages from a first mobile device to a second mobile device, in accordance with an embodiment of the present invention.
Figure 8:
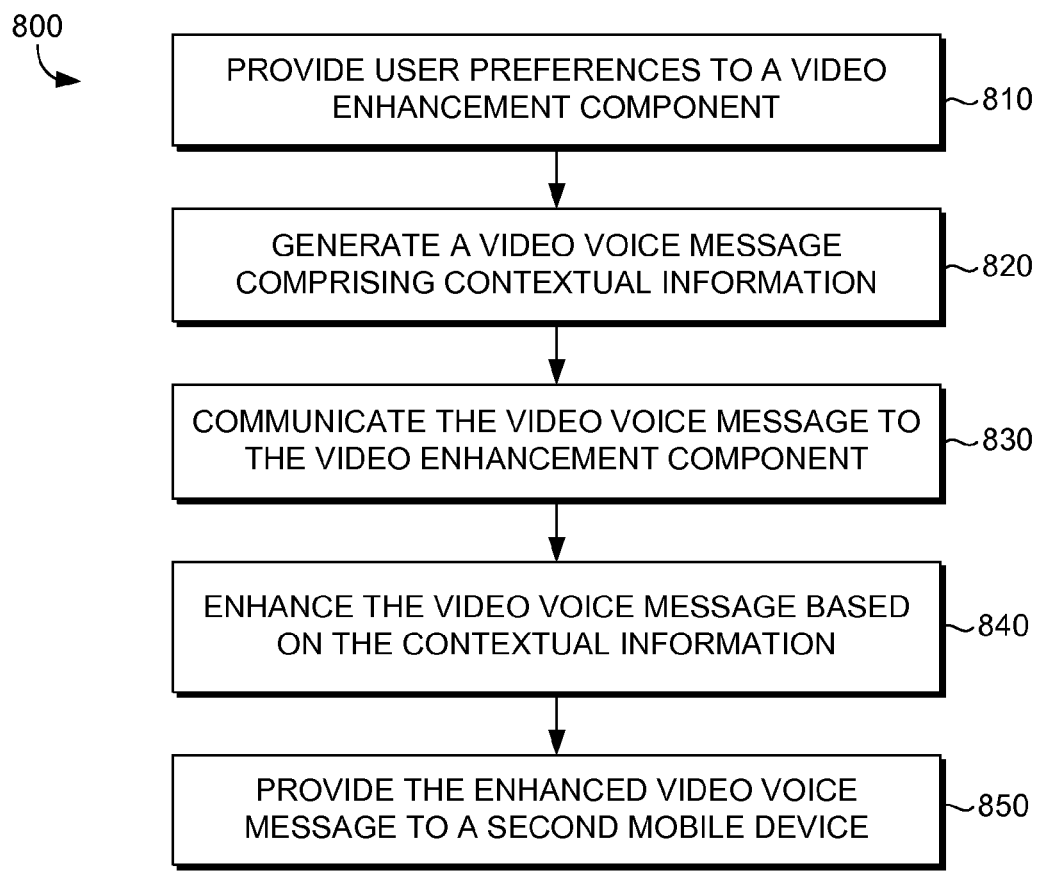
FIG. 8 is a further flow diagram showing an embodiment of a method of providing enhanced video voice messages from a first mobile device to a second mobile device, in accordance with an embodiment of the present invention.

FIG. 7 is another flow diagram 700 showing an embodiment of a method of providing enhanced video voice message content from a first mobile device to a second mobile device, in accordance with an embodiment of the present invention. At step 710, user preferences associated with adjusting a video voice are received at a first mobile device. For example, the user preferences associated with adjusting a video voice message may be embedded in a video voice message received from the first mobile device. At step 720, a video voice message is received from the first mobile device. The video voice message is directed to a second mobile device having identification information. The identification information of the second mobile device may comprise at least one of a network access identifier (NAI), an electronic serial number (ESN), and a location of the second device.

At step 730, user preferences associated with the identification information of the second mobile device are determined. In particular, user preferences are determined based on the identification information of the second mobile device. At step 740, the video voice message is enhanced based on the determined user preferences. Enhancing the video voice message may comprise retrieving a background stored in association with the identification of the second mobile device and adjusting the background of the video voice message to match the stored background. The background may be stored at the first mobile device. Alternatively, enhancing the video voice message may comprise modifying clothes of a person in the video voice message.

At step 750, the enhanced video voice message content is provided to the second mobile device. In further embodiments, a video voice message addressed to a plurality of mobile devices may be generated. Each of the plurality of mobile devices may have unique identification information. Further, the video voice message may be adjusted based on identification information of the plurality of mobile devices. Additionally, each of the plurality of mobile devices may be presented with an uniquely enhanced video voice message.

FIG. is a further flow diagram 800 showing an embodiment of a method of providing enhanced video voice message content from a first mobile device to a second mobile device, in accordance with an embodiment of the present invention.

At step 810, user preferences are provided from a first mobile device to a video content enhancement component. The user preferences are based on contextual information of the first mobile device. For example, the contextual information of the first mobile device may comprise a location of the first mobile device. At step 820, a video voice message is generated at the first mobile device. The video voice message comprises contextual information of the first mobile device. At step 830, the video voice message is communicated to the video enhancement component. At step 840, the video voice message is enhanced based on the contextual information of the first mobile device. In particular, the video voice message is enhanced at the video component. For example, enhancing the video voice message may comprise retrieving a background stored in association with the location of the first mobile device and adjusting the background of the video voice message to match the stored background. The background may be stored at the video enhancement component. At step 850, the enhanced video voice message is presented to the second mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-readable media ("media") having computer-usable instructions embodied thereon for a method of providing enhanced video voice messages from a first mobile device to a second mobile device, the method comprising:
    receiving user preferences, which are sent from a first mobile device, by a video enhancement component;
    receiving a video voice message, which is sent from the first mobile device;
    communicating the video voice message to the video enhancement component;
    enhancing, at the video enhancement component, the video voice message based on the user preferences from the first mobile device; and
    providing the enhanced video voice message to the second mobile device.

2. The media of claim 1, wherein enhancing the video voice message comprises:
    retrieving a background stored in association with the user preferences from the first mobile device; and
    adjusting a background of the video voice message to match the background stored in association with the user preferences from the first mobile device.

3. The media of claim 2, wherein the background is stored at the video enhancement component.

4. The media of claim 2, wherein the background is stored at the first mobile device.

5. The media of claim 1, wherein enhancing the video voice message comprises modifying clothes of a person in the video voice message.

6. The media of claim 1, wherein the user preferences from the first mobile device are embedded in the video voice message.

7. The media of claim 1, further comprising:
    generating a video voice message addressed to a plurality of mobile devices each having identification information; and
    adjusting the video voice message based on identification information of the plurality of mobile devices, wherein each of the plurality of mobile devices is presented with an uniquely enhanced video voice message.

8. One or more computer-readable media ("media") having computer-usable instructions embodied thereon for a method of providing enhanced video voice messages from a first mobile device to a second mobile device, the method comprising:
    receiving, from a first mobile device, user preferences associated with enhancing a video voice message;
    receiving a video voice message from the first mobile device, wherein the video voice message is directed to a second mobile device having identification information;
    based on the identification information of the second mobile device, determining user preferences associated with the identification information of the second mobile device;
    enhancing the video voice message based on the determined user preferences; and
    providing the enhanced video voice message to the second mobile device.

9. The media of claim 8, wherein enhancing the video voice message comprises modifying clothes of a person in the video voice message.

10. The media of claim 8, wherein the user preferences associated with enhancing a video voice message are embedded in the video voice message received from the first mobile device.

11. The media of claim 8, wherein the identification information of the second mobile device comprises a network access identifier (NAI).

12. The media of claim 8, wherein the identification information of the second mobile device comprises an electronic serial number (ESN).

13. The media of claim 8, wherein the identification information of the second mobile device comprises a location of the second mobile device.

14. The media of claim 8, wherein enhancing the video voice message comprises:
    retrieving a background stored in association with the identification of the second mobile device; and
    adjusting the background of the video voice message to match the stored background.

15. The media of claim 14, wherein the background is stored at the first mobile device.

16. The media of claim 14, wherein the background is stored at a Dynamic Video Voicemail Irreality Nexus (DyVINe) server.

17. One or more computer-readable media ("media") having computer-usable instructions embodied thereon for a method of providing enhanced video voice messages from a first mobile device to a second mobile device, the method comprising:
    providing user preferences from a first mobile device to a video enhancement component, wherein the user preferences are based on contextual information of the first mobile device;
    receiving a video voice message from the first mobile device, wherein the video voice message comprises contextual information of the first mobile device;
    communicating the video voice message to the video enhancement component;

enhancing, at the video enhancement component, the video voice message based on the contextual information of the first mobile device; and providing the enhanced video voice message to the second mobile device.

18. The media of claim 17, wherein the contextual information of the first mobile device comprises a location of the first mobile device.

19. The media of claim 18, wherein enhancing the video voice message comprises:

retrieving a background stored in association with the location of the first mobile device; and adjusting the background of the video voice message to match the stored background.

20. The media of claim 19, wherein the background is stored at the video enhancement component.

* * * * *